US012037798B2

(12) United States Patent
Shaw et al.

(10) Patent No.: US 12,037,798 B2
(45) Date of Patent: Jul. 16, 2024

(54) SURFACE PRODUCTS WITH MULTIPLE VENEER SEGMENTS

(71) Applicant: SHAW INDUSTRIES GROUP, INC., Dalton, GA (US)

(72) Inventors: Jason Shaw, Taylors, SC (US); Patrick Pusateri, Simpsonville, SC (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/274,311

(22) PCT Filed: Jan. 31, 2023

(86) PCT No.: PCT/US2023/011986
§ 371 (c)(1),
(2) Date: Jul. 26, 2023

(87) PCT Pub. No.: WO2023/150111
PCT Pub. Date: Aug. 10, 2023

(65) Prior Publication Data
US 2024/0044152 A1    Feb. 8, 2024

Related U.S. Application Data

(60) Provisional application No. 63/305,409, filed on Feb. 1, 2022.

(51) Int. Cl.
*E04F 15/04*   (2006.01)
*B32B 3/06*    (2006.01)
(Continued)

(52) U.S. Cl.
CPC ............. *E04F 15/045* (2013.01); *B32B 3/06* (2013.01); *B32B 21/13* (2013.01); *B32B 21/14* (2013.01);
(Continued)

(58) Field of Classification Search
CPC ............. E04F 15/045; E04F 15/02038; E04F 2201/0107; E04F 2201/023;
(Continued)

(56) References Cited

U.S. PATENT DOCUMENTS 1,548,911 A * 8/1925 Sherman ................. B32B 13/10
                                                                 428/921
2,545,603 A *  3/1951 Byers ....................... B27D 1/00
                                                                  156/60
(Continued)

FOREIGN PATENT DOCUMENTS

CH             306711 A    4/1955

OTHER PUBLICATIONS

PCT Search Report and Written Opinion for PCT/US23/11986, dated May 2, 2023.

*Primary Examiner* — Patrick J Maestri
(74) *Attorney, Agent, or Firm* — Ballard Spahr LLP (57) ABSTRACT

A surfacing product (e.g., flooring element) can be elongate along a longitudinal axis. The surfacing product can have a core having a first surface and an opposed second surface that are spaced along a thickness axis. A veneer can be coupled to the first surface of the core. The veneer can have a first veneer segment that is elongate along the longitudinal axis, a second veneer segment that is elongate along the longitudinal axis, and an insert segment positioned between the first veneer segment and the second veneer segment along the longitudinal axis.

33 Claims, 5 Drawing Sheets

(51) Int. Cl.
*B32B 21/13* (2006.01)
*B32B 21/14* (2006.01)
*B32B 37/12* (2006.01)
*B32B 38/00* (2006.01)
*C09D 163/00* (2006.01)
*C09J 175/04* (2006.01)
*E04F 15/02* (2006.01)

(52) U.S. Cl.
CPC .......... *B32B 37/12* (2013.01); *B32B 38/0012* (2013.01); *C09D 163/00* (2013.01); *C09J 175/04* (2013.01); *E04F 15/02038* (2013.01); *B32B 2038/0016* (2013.01); *B32B 2310/0831* (2013.01); *B32B 2317/16* (2013.01); *B32B 2363/00* (2013.01); *B32B 2375/00* (2013.01); *B32B 2419/04* (2013.01); *E04F 2201/0107* (2013.01); *E04F 2201/023* (2013.01); *E04F 2201/043* (2013.01)

(58) Field of Classification Search
CPC ...... E04F 2201/043; B32B 3/06; B32B 21/13; B32B 21/14; B32B 2317/16; B32B 2419/04
See application file for complete search history.

(56) References Cited

U.S. PATENT DOCUMENTS

| | | | |
|---|---|---|---|
| 4,584,222 A * | 4/1986 | Iwamoto | B27D 1/04 428/56 |
| 4,853,062 A | 8/1989 | Gartland | |
| 2005/0268571 A1 * | 12/2005 | Magnusson | E04F 15/04 52/590.2 |
| 2008/0028911 A1 | 2/2008 | DiSanto | |
| 2011/0083773 A1 | 4/2011 | Runonen | |
| 2015/0211238 A1 | 7/2015 | Moriau et al. | |
| 2019/0283282 A1 | 9/2019 | Springer | |
| 2021/0078305 A1 | 3/2021 | Schulte | |

* cited by examiner

SURFACE PRODUCTS WITH MULTIPLE VENEER SEGMENTS

CROSS-REFERENCE TO RELATED APPLICATION

This application is a 35 U.S.C. § 371 national phase filing of International Patent Application No. PCT/US2023/011986, filed Jan. 31, 2023, which claims priority to and the benefit of U.S. Provisional Patent Application No. 63/305,409, filed Feb. 1, 2022. The content of each of these applications is incorporated herein by reference in its entirety.

FIELD

This application relates generally to surfacing products (e.g., flooring materials) and surface coverings comprising the same.

BACKGROUND

Conventional flooring materials with wood veneer use a continuous length of wood veneer that extends across the entire face of a core, which can be, for example, seven to eight feet long. Accordingly, segments of veneer that are shorter than the length of the core must be disposed of as waste. Thus, in addition to generating environmental waste, manufacturers sourcing the wood veneer have to pay the cost of the waste.

SUMMARY

Described herein, in various aspects, is a surfacing product having a longitudinal axis, a transverse axis that is perpendicular to the longitudinal axis, and a thickness axis that is perpendicular to each of the longitudinal axis and the transverse axis. The surfacing product can comprise a core having a first surface and an opposed second surface that are spaced along the thickness axis. A veneer can be coupled to the first surface of the core. The veneer can comprise a first veneer segment that is elongate along the longitudinal axis, a second veneer segment that is elongate along the longitudinal axis, and an insert segment positioned between the first veneer segment and the second veneer segment along the longitudinal axis.

Also disclosed herein are methods of making such surfacing products.

Also disclosed herein are surface coverings comprising such surfacing products.

Also disclosed herein are kits comprising such surfacing products.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

These and other features of the preferred embodiments of the invention will become more apparent in the detailed description in which reference is made to the appended drawings wherein.

DETAILED DESCRIPTION

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a segment" includes one or more of such segments, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects. Similarly, where angles are approximated by use of the antecedent "generally," such as "generally perpendicular to" or "generally parallel to,"

orientations within 15 degrees, or within 10 degrees, or within 5 degrees, or within one degree of perpendicular or parallel are contemplated.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Disclosed herein are surfacing products, such as, for example, flooring elements, wall covering elements, ceiling covering elements, etc. Thus, in use, the disclosed surfacing products can be used to define all or a portion of a floor covering, a wall covering, or a ceiling covering. Accordingly, in some aspects, the surfacing products can be positioned over a subfloor or wall or ceiling structure to form the exposed surface of the respective floor, wall, or ceiling.

Referring to FIGS. 1-7, an exemplary surfacing product 10 (e.g., a single surfacing panel) can have a longitudinal axis 12, a transverse axis 14 that is perpendicular to the longitudinal axis, and a thickness axis 16 that is perpendicular to each of the longitudinal axis and the transverse axis. The surfacing product 10 can comprise a core 20 having a first surface 22 and an opposed second surface 24 that are spaced along the thickness axis 16. A veneer 30 can be coupled to the first surface 22 of the core 20. The veneer 30 can comprise a first veneer segment 32 that is elongate along the longitudinal axis 12, a second veneer segment 34 that is elongate along the longitudinal axis 12, and an insert segment 36 positioned between the first veneer segment and the second veneer segment along the longitudinal axis. Optionally, in these aspects, the first and second veneer segments 32, 34 can have respective lengths along the longitudinal axis 12 and respective widths along the transverse axis 14, wherein the lengths of the first and second veneer segments are greater than their widths. In further aspects, the surfacing product 10 can comprise three or more veneer segments, with respective insert segments between adjacent veneer segments of the three or more veneer segments.

Figure 2:
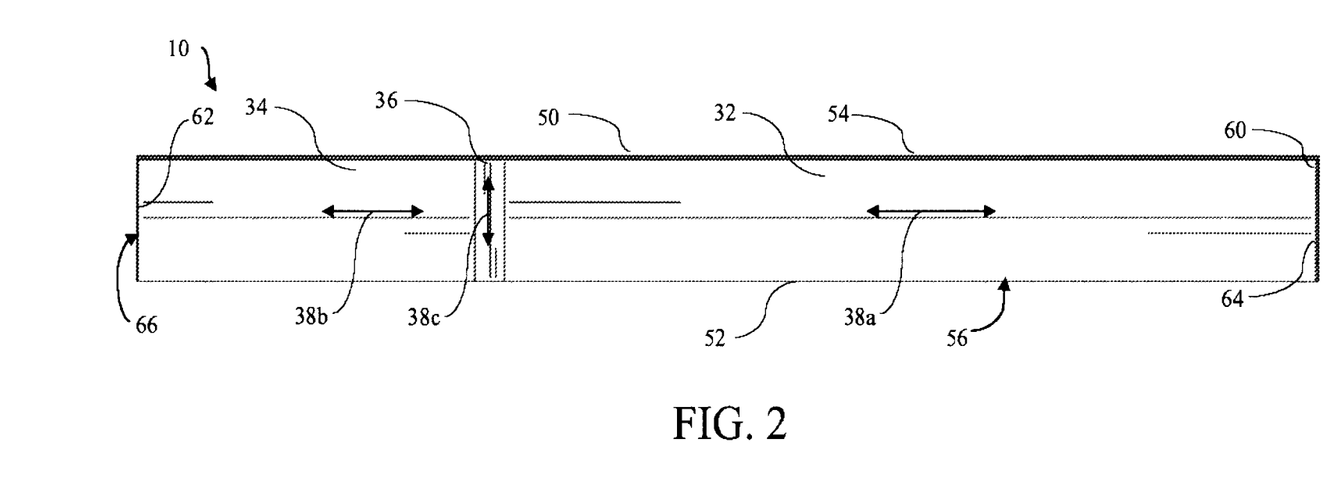
FIG. 2 is a top view of the surfacing product of FIG. 1.
Figure 3:
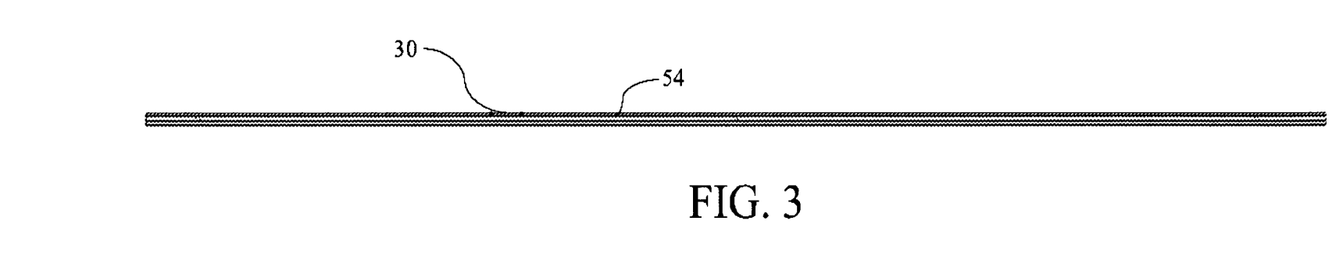
FIG. 3 is a side view of the surfacing product of FIG. 1.

Referring to FIG. 2, in some aspects, the first veneer segment 32 can have a grain (e.g., a wood grain or a faux wood grain) that extends along a first grain axis 38a, the second veneer segment 34 can have a grain that extends along a second grain axis 38b, and the insert segment 36 can have a grain that extends along a third grain axis 38c. In some optional aspects, the grain axis 38a of the grain of the first veneer segment 32 can be angularly offset from the grain axis 38c of the grain of the insert segment 36. For example, the grain axis 38a of the grain of the first veneer segment 32 can be perpendicular to or generally perpendicular to the grain axis 38c of the grain of the insert segment 36. In further aspects, the grain axis 38a of the grain of the first veneer segment 32 can be parallel to or generally parallel to the grain axis 38b of the grain of the second veneer segment 34.

In exemplary aspects, the respective grain axes 38a,b of the first and second veneer segments 32, 34 can extend along (optionally, parallel to or generally parallel to) the longitudinal axis 12. In some optional aspects, the grain axis 38c of the insert segment 36 can extend along (optionally, parallel to or generally parallel to) the transverse axis 14. In further aspects, the grain axis 38a of the grain of the first veneer segment 32 can form an angle with the grain axis 38c of the insert segment of about 70 degrees to about 90 degrees, from about 0 to about 70 degrees, or from 30 degrees to about 60 degrees or about 45 degrees.

In some aspects, the insert segment 36 can be elongate along the transverse axis 14. That is, the insert segment 36 can have a length along the transverse axis 14 and a width along the longitudinal axis 12, wherein the length is greater than the width. Thus, the length of the insert segment can correspond or generally correspond to the width of the first and second veneer segments 32, 34. Accordingly, in some aspects, the insert segment 36 that is positioned between the first veneer segment 32 and the second veneer segment 34 along the longitudinal axis 12 can be elongate along the transverse axis 14. In other aspects, the insert segment 36 can be elongate along the longitudinal axis 12. Optionally, in these aspects in which the insert segment 36 is elongate along the longitudinal axis 12, it is contemplated that the first and second veneer segments 32, 34 and the insert segment 36 can each be elongate along the longitudinal axis 12 and have a common (or substantially common) width along the transverse axis 14.

In some optional aspects, the first and second veneer segments 32, 34 can comprise (optionally, consist of) the same material. For example, the first and second veneer segments 32, 34 can comprise or consist of the same type of wood. In some aspects, the insert segment 36 can comprise (optionally, consist of) the same material as each of the first and second veneer segments 32, 34. In further aspects, the insert segment 36 can comprise a different material from each of the first and second veneer segments 32, 34. For example, the first and second veneer segments 32, 34 can comprise a first material, and the insert segment 36 can comprise a second material that is different from the first material. In still further aspects, the first and second veneer segments 32, 34 can comprise different materials. In some optional aspects, each of the first veneer segment 32, the second veneer segment 34, and the insert segment 36 can comprise a different material. The different materials can comprise different woods. The different woods can have different properties such as color, darkness, wood pattern (e.g., grain), etc. In some aspects, the first and second veneer segments 32, 34 and the insert segment 36 can comprise natural wood. In other aspects, the first and second veneer segments 32, 34 and the insert segment 36 can comprise faux wood.

In some aspects, one or more of the first veneer segment 32, the second veneer segment 34, or the insert segment 36 can comprise wood. Optionally, the wood can be oak (e.g., white oak). In further aspects, the veneer can comprise ash, birch, cherry, maple, pine, poplar, and walnut. In various aspects, the veneer can comprise softwood materials, man-made wood veneers, and hardwood materials, wood composite materials (e.g., high density fiberboard (HDF)), and high-pressure laminates, such as a composition of a phenolic resin-impregnated Kraft sheet covered by a melamine decorative sheet. Suitable wood composite materials include softboard, medium density fiberboard, hardboard, particleboard, plywood, and waferboard. In further aspects, the veneer can comprise stone, such as, for example, granite, marble, limestone, or slate. In still further aspects, the veneer can comprise plant based product such as bamboo or hemp material.

In some aspects, the core 20 can comprise wood. For example, the wood of the core can be birch, which can be less expensive than the material of the veneer. In some aspects, the core can comprise plywood. In further aspects, the core 20 can comprise high density fiberboard (HDF), stone polymer composite (SPC), wood polymer composite (WPC), oriented strand board (OSB) or magnesium oxysulfate (MGO). Generally, the core 20 can comprise a material that is less expensive than the veneer. The core material 20 can comprise a plurality of core segments that are coupled together at one or more respective lap joint junctions.

In some optional aspects, the first and second veneer segments 32, 34 can abut opposing side edges of the insert segment 36. In some aspects, the surfacing product 10 can have a length along the longitudinal axis. Optionally, the first veneer segment 32, second veneer segment 34, and insert segment 36 can cooperatively extend along the entire length, or substantially the entire length of the surfacing product 10.

In some aspects, the first veneer segment 32 can have a first length along the longitudinal axis 12, and the second veneer segment 34 can have a second length along the longitudinal axis. Optionally, the first length can be at least 25%, at least 35%, at least 50%, or at least greater than the second length. In these aspects, the insert segment 36 can be offset from a center position along the longitudinal axis 12. In further optional aspects, the first length can be within 15% of the second length. For example, in some aspects, the first and second lengths can be equal to or substantially equal to each other. In these aspects, the insert segment 36 can be centered or generally centered along the longitudinal axis 12.

In exemplary aspects, the surfacing product 10 can have a length of about 80 inches (e.g., about 82.5 inches) and a width of about 8 inches. In various aspects, the respective first and second lengths of the first and second veneer segments 32, 34 can each be from about 30 to about 50 inches, from about 35 inches to about 45 inches, or about 40 inches. In further aspects, the first length of the first veneer segment 32 can be from about 50 inches to about inches and the second length of the second veneer segment 34 can be from about 10 inches to about 30 inches. The insert segment 36 can optionally have a width along the longitudinal axis 12, wherein the width is from about 1 inch to about 8 inches, or about 2 inches. In further optional aspects, the surfacing product 10 can have any suitable length, including, for example, from about 36 inches to about 120 inches. The surfacing product 10 can similarly have any suitable width, including, for example, from about 4 inches to about 16 inches. Optionally, the veneer 30 can have a thickness along the thickness axis 16 from about 1 to about 5 mm (e.g., about 3 mm or about 3.2 mm).

The surfacing product 10 can have opposing first and second edges 50, 52 that are spaced along the transverse axis 14 and extend longitudinally along a length of the surfacing product. The first and second edges 50, 52 can define, respectively, a tongue 54 and a groove 56. The surfacing product 10 can have opposing third and fourth edges 60, 62 that are spaced along the longitudinal axis 12 and extend transversely along a width of the surfacing product. The third and fourth edges 60, 62 can define, respectively, a tongue 64 and a groove 66. It should be understood that "first" and "second," with reference to the veneer segments, should be understood to be arbitrary in the context of position of the veneer segments relative to the tongue 64 and groove 66. Thus, in describing respective lengths of the first and second veneer segments 32, 34, a first veneer segment having a greater length than a second veneer segment can be proximate to the tongue 64 (e.g., as shown in surfacing product 10a in FIG. 7) or the groove 66 (e.g., as shown in surfacing product 10b in FIG. 7).

In still further aspects, the surfacing product 10 can have three or more veneer segments, optionally, with respective insert segments disposed therebetween sequential veneer segments.

In some aspects, the surfacing product 10 can be embodied as a single panel. Accordingly, in some aspects, the components of the surfacing product 10 can be coupled together so that the surfacing product 10 is a unitary panel. In some aspects, the unitary panel can be a flooring panel. In other aspects, the unitary panel can be a wall panel. In some aspects, the unitary panel can be a ceiling panel.

Figures 6, 7:
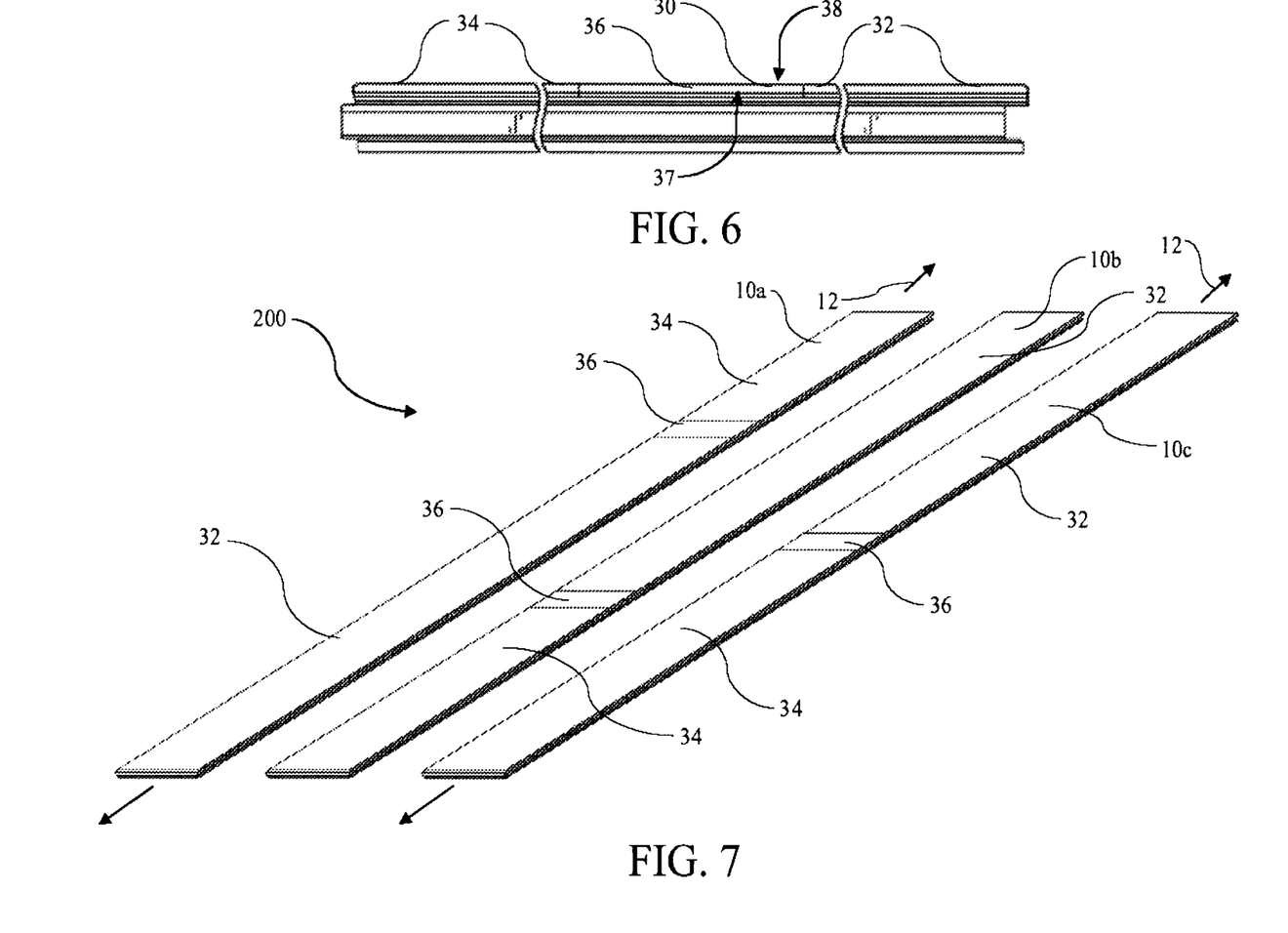
FIG. 6 is a partial side view of the surfacing product showing detail of the profile and veneer.
FIG. 7 is a perspective view of a plurality of surfacing products as disclosed herein.

Referring to FIG. 7, a kit 200 can comprise a plurality of surface covering products 10. In some optional aspects, the plurality of surfacing products can comprise respective insert segments 36 that are in different longitudinal positions along the longitudinal axis of the respective covering products. For example, the plurality of surfacing product can comprise a first surface covering product 10a having the insert segment 36 offset from center toward the tongue 64, a second surface covering product 10b having the insert segment 36 offset from center toward the groove 66, and a third insert segment 36 that is generally longitudinally centered between the third and fourth edges 60, 62. In this way, a surface covering formed with the plurality of surface covering products 10 can produce a random or seemingly random aesthetic that does not show a repeating pattern.

Figure 8:
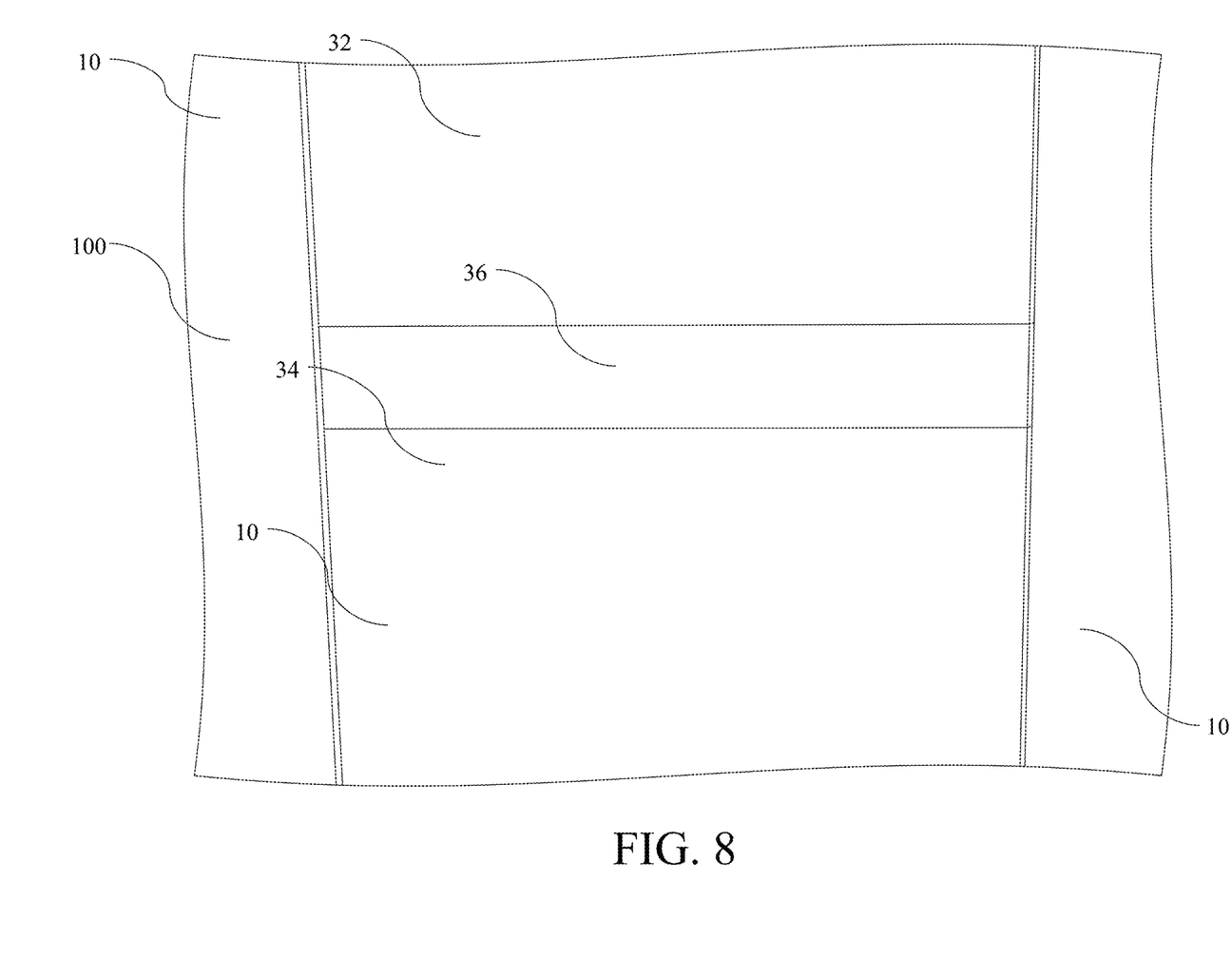
FIG. 8 is an image of an exemplary surface covering comprising a plurality of surfacing products as disclosed herein.

Referring also to FIG. 8, a surface covering 100 can comprise a plurality of surfacing products 10. In exemplary aspects, the plurality of surfacing products can have the insert segments positioned at various locations along the length of the respective surfacing product. In some optional aspects, the first veneer segment 32 of a first surfacing product 10a of the plurality of surfacing products can have a first length along the longitudinal axis 12 of the first surfacing product, the second veneer segment 24 of the first surfacing product can have a second length along the longitudinal axis of the first surfacing product, and the first veneer segment 32 of a second surfacing product 10b of the plurality of surfacing products can have a third length along the longitudinal axis of the second surfacing product, wherein the third length is different from the first length and the second length. The surface covering 100 can be intentionally installed with offset longitudinal ends between rows to provide additional pattern randomness.

The disclosed surface covering products 10 can reduce or eliminate waste from shorter veneer lengths, which cannot be used with existing veneer products. Further, the disclosed surface covering products can produce a desirable aesthetic look for a surface covering.

Exemplary Method of Manufacturing

Figure 1:
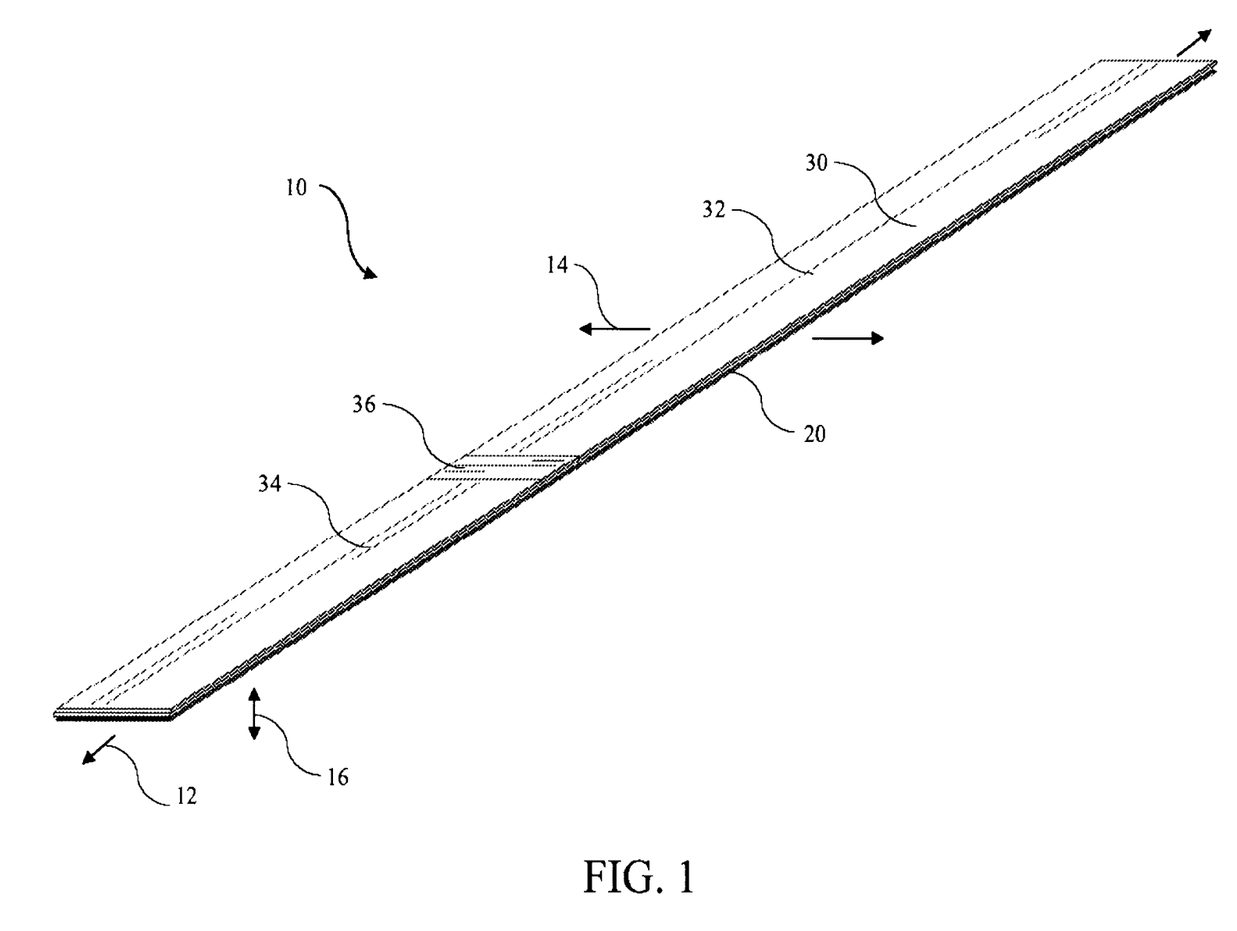
FIG. 1 is a perspective view of an exemplary surfacing product as disclosed herein.
Figure 4:
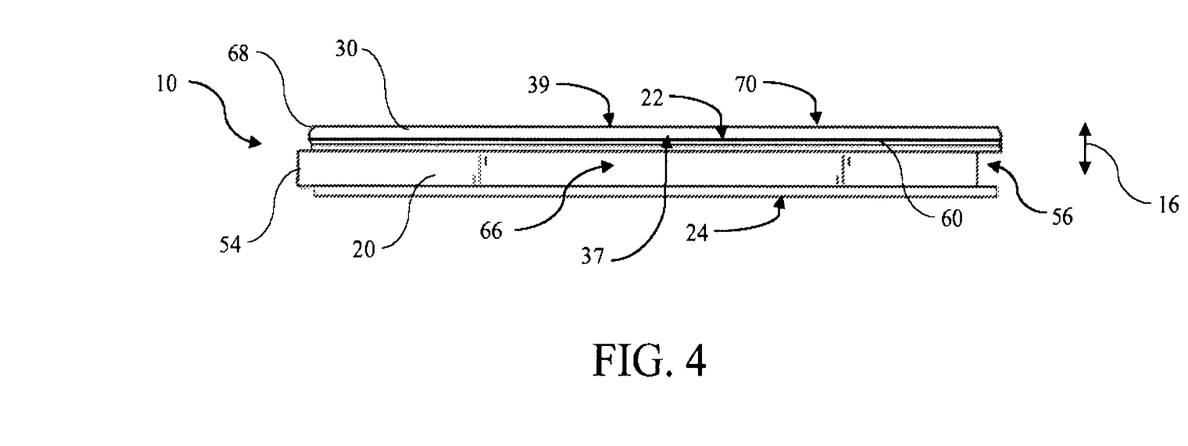
FIG. 4 is a first end view of the surfacing product of FIG. 1.
Figure 5:
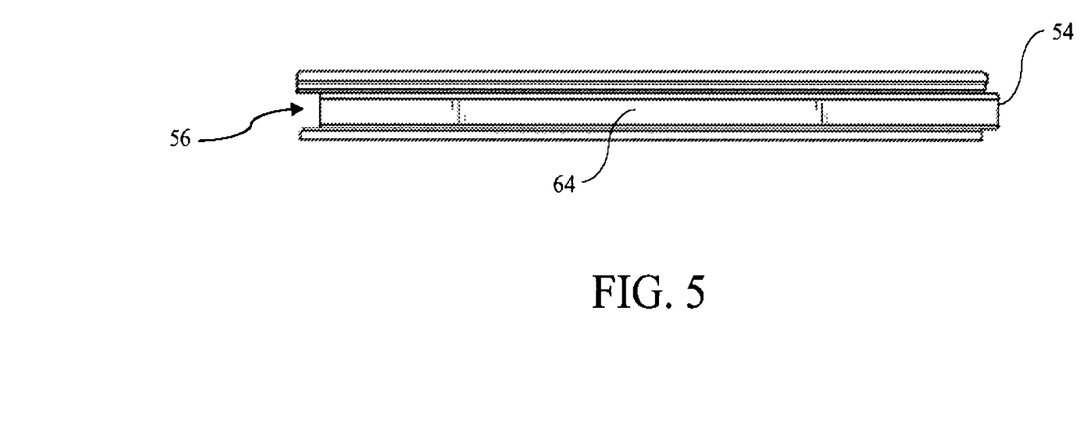
FIG. 5 is a second end view of the surfacing product of FIG. 1.

Referring to FIGS. 1, 2, and 4, in some aspects, the first veneer segment 32, second veneer segment 34, and insert segment 36 can be coupled to the core 20. For example, a binder 60 can be deposited on the first surface 22 of the core (e.g., via roll coating), and the first veneer segment 32, second veneer segment 34, and insert segment 36 can then be positioned on the core 20. The binder 60 can optionally comprise polyurethane resin. However, it is contemplated that other binders can be used. The veneer 30 can be pressed against the core 20 with the binder 60 therebetween. Optionally, a side stop and an end stop can be used to align the edges of the veneer 30 with the edges of the core 20.

The veneer 30 can have a first surface 37 that faces the core 20 and an opposed second surface 39. An epoxy 70 can be deposited on at least a portion of the second surface 39 of the veneer 30. The epoxy 62 can fill voids and imperfections on the face of the veneer 30. The epoxy 70 can be sanded once cured. In this way, a desired thickness tolerance and smooth face can be provided. Optionally, putty (e.g., water-based putty) can be used to touch up or otherwise correct or address imperfections.

In various aspects, the veneer 30 can be brushed (or otherwise engaged or contacted) to form a texture on the veneer. In further aspects, a stain can be deposited on the veneer 30. The stain can be cured, optionally using ultraviolet (UV) light. One or more top-coats and/or UV-cured sealers can be deposited on the veneer 30.

The surfacing product 10 can be finished by cutting or otherwise forming the edges to provide the tongues and grooves as disclosed herein. A bevel 68 can be milled along the upper perimeter.

The core 20 can be formed from a plurality of sheets (e.g., 60 inch by 60 inch by 0.47 inches (12 mm) sheets), such as, for example, Russian Birch plywood sheets. The sheets can be sanded to ensure tolerances and can then be formed with lap joints on opposing sides (e.g., an upper lap on a first side and a lower lap on an opposing second side). Sheets can then be cut perpendicular to the length of the lap joints to form planks having a desired width (e.g., 8.25 inches). The planks can be coupled end-to-end via lap joints and glued together. The glued and assembled planks can be cut at a desired length (e.g., at 84 inches) to provide the core 20.

Optionally, after forming the surfacing products 10, the surfacing products can be inspected. If the surfacing products have a defect, the defect can be cut out of the surfacing product to provide two sections, each section having a cut end, and the cut end of each section can have the corresponding tongue or groove formed thereon, a bevel milled at the upper perimeter, and the cut parts re-stained/finished to match the already finished portions.

In various aspects, cut sections can have a minimum length (e.g., 9 inches) on each side of the insert segment 36, or the insert can be cut off and disposed of to provide two shorter cut sections. Accordingly, the surfacing products 10 having an insert (e.g., a cut section) can have a minimum length of at least 20 inches. A minimum length for a surfacing product without an insert segment 36 can be 16 inches.

Optionally, a kit can comprise a plurality of full-length surfacing products 10 (e.g., a surfacing product with no portions cut out to render one or more cut sections) and one or more finished cut sections. Optionally, two cut sections, one with an insert segment and one without, can be provided within a kit so that the two cut sections can be assembled to have the same length as or about the same as (e.g., within 10%, or within 5%, or within 3%, or within 2%, or within 1% of) the length of one full surfacing product.

EXEMPLARY ASPECTS

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A surfacing product having a longitudinal axis, a transverse axis that is perpendicular to the longitudinal axis, and a thickness axis that is perpendicular to each of the longitudinal axis and the transverse axis, the surfacing product comprising:
  a core having a first surface and an opposed second surface that are spaced along the thickness axis; and
  a veneer coupled to the first surface of the core, wherein the veneer comprises:
    a first veneer segment that is elongate along the longitudinal axis;
    a second veneer segment that is elongate along the longitudinal axis; and
    an insert segment, wherein along the longitudinal axis, the insert segment is positioned between the first veneer segment and the second veneer segment.

Aspect 2: The surfacing product of aspect 1, wherein each of the first veneer segment, second veneer segment, and insert segment have a respective grain, each respective grain extending along a respective grain axis, wherein the grain axis of the grain of the first veneer segment is angularly offset from the grain axis of the grain of the insert segment.

Aspect 3: The surfacing product of aspect 2, wherein the grain axes of the grains of the first and second veneer segments are parallel or generally parallel to each other.

Aspect 4: The surfacing product of aspect 2 or aspect 3, wherein the axis of the grain of the first veneer segment is perpendicular or generally perpendicular to the axis of the grain of the second veneer segment.

Aspect 5: The surfacing product of any one of the preceding aspects, wherein the insert segment is elongate along the transverse axis.

Aspect 6: The surfacing product of any one of the preceding aspects, wherein the first veneer segment and the second veneer segment comprise the same material.

Aspect 7: The surfacing product of any one of the preceding aspects, wherein each of the first veneer segment, the second veneer segment, and the insert segment comprise the same material.

Aspect 8: The surfacing product of any one of aspects 1-5, wherein the first veneer and the second veneer each comprise a first material, wherein the insert segment comprises a second material that is different from the first material.

Aspect 9: The surfacing product of any one of aspects 1-5, wherein each of the first veneer segment, second veneer segment, and insert segment comprise a different material.

Aspect 10: The surfacing product of any one of the preceding aspects, wherein the first veneer segment has a first length along the longitudinal axis, wherein the second veneer segment has a second length along the longitudinal axis, wherein the first length is at least 50% greater than the second length.

Aspect 11: The surfacing product of any one of aspects 1-9, wherein the first veneer segment has a first length along the longitudinal axis, wherein the second veneer segment has a second length along the longitudinal axis, wherein the first length is within 15% of the second length.

Aspect 12: The surfacing product of any one of the preceding aspects, wherein at least one of the first veneer segment, the second veneer segment, or the insert segment comprises wood.

Aspect 13: The surfacing product of any one of the preceding aspects, wherein at least one of the first veneer segment, the second veneer segment, or the insert segment comprises oak.

Aspect 14: The surfacing product of aspect 13, wherein the oak is white oak.

Aspect 15: The surfacing product of any one of the preceding aspects, wherein the core comprises wood.

Aspect 16: The surfacing product of aspect 15, wherein the wood of the core is Russian Birch.

Aspect 17: The surfacing product of aspect 15 or aspect 16, wherein the core comprises plywood.

Aspect 18: The surfacing product of any one of aspects 15-17, wherein the core material comprises a plurality of core segments that are coupled together at one or more respective lap Joint junctions.

Aspect 19: The surfacing product of any one of the preceding aspects, wherein the surfacing product has first and second edges that are spaced along the transverse axis and extend longitudinally along a length of the surfacing product, wherein the first and second edges define, respectively, a tongue and a groove.

Aspect 20: The surfacing product of any one of the preceding aspects, wherein the first veneer segment and the second veneer segment abut the insert segment.

Aspect 21: The surfacing product of any one of the preceding aspects, wherein the surfacing product has a length along the longitudinal axis, wherein the first, second, and insert segments cooperatively extend along the entire length, or substantially the entire length, of the surfacing product along the longitudinal axis.

Aspect 22: A method of making the surfacing product of any one of the preceding aspects, the method comprising: coupling the first veneer segment, the second veneer segment, and the insert segment to the core with a binder.

Aspect 23: The method of aspect 22, comprising: depositing the binder on the core; and positioning the first veneer segment, the second veneer segment, and the insert segment on the core.

Aspect 24: The method of aspect 23, wherein depositing the binder on the core comprises roll coating the binder onto the core.

Aspect 25: The method of aspect 23 or aspect 24, wherein the binder comprises polyurethane resin.

Aspect 26: The method of any one of aspects 22-25, further comprising pressing the core with the veneer.

Aspect 27: The method of any one of aspects 22-26, further comprising depositing epoxy on at least a portion of the veneer.

Aspect 28: The method of aspect 27, further comprising sanding the epoxy.

Aspect 29: The method of any one of aspects 22-28, wherein the surfacing product has first and second edges that are spaced along the transverse axis and extend longitudinally along the surfacing product, the method further comprising milling a tongue on the first edge and milling a groove on the second edge.

Aspect 30: The method of any one of aspects 22-28, further comprising brushing the veneer to form a texture on the veneer.

Aspect 31: The method of any one of aspects 22-28, further comprising depositing stain on the veneer.

Aspect 32: The method of aspect 31, further comprising curing the stain with ultraviolet light (UV).

Aspect 33: The method of any one of aspects 22-28, further comprising applying one or more top coats and/or UV-cured sealers.

Aspect 34: A surface covering comprising: a plurality of surfacing products as in any one of aspects 1-21, wherein the plurality of surfacing products are coupled together to define the surface covering.

Aspect 35: The surface covering of aspect 34, wherein the first veneer segment of a first surfacing product of the plurality of surfacing products has a first length along the longitudinal axis of the first surfacing product, wherein the second veneer segment of the first surfacing product has a second length along the longitudinal axis of the first surfacing product, wherein the first veneer segment of a second surfacing product of the plurality of surfacing products has a third length along the longitudinal axis of the second surfacing product, wherein the third length is different from the first length and the second length.

Aspect 36: A kit comprising: a plurality of surfacing products as in any one of claims 1-21, wherein the plurality of surfacing products are configured to be selectively coupled together to define a surface covering.

Aspect 37: The kit of aspect 36, wherein the plurality of surfacing products comprise:
a first covering product having a length; and
at least one surface covering product having a length that is shorter than the length of the first surface covering product.

Aspect 38: The kit of aspect 37, wherein the at least at least one surface covering product having a length that is shorter than the length of the first surface covering product comprises two surface covering products having respective lengths, wherein a sum of the lengths of the two surface covering products are about equal to the length of the first surface covering product.

Although the foregoing invention has been described in some detail by way of illustration and example for purposes of clarity of understanding, certain changes and modifications may be practiced within the scope of the appended claims.

What is claimed is:

1. A surfacing product having a longitudinal axis, a transverse axis that is perpendicular to the longitudinal axis, and a thickness axis that is perpendicular to each of the longitudinal axis and the transverse axis, the surfacing product comprising:
a core having a first surface and an opposed second surface that are spaced along the thickness axis; and
a veneer coupled to the first surface of the core, wherein the veneer comprises:
a first veneer segment that is elongate along the longitudinal axis;
a second veneer segment that is elongate along the longitudinal axis; and
an insert segment, wherein along the longitudinal axis, the insert segment is positioned between the first veneer segment and the second veneer segment,
wherein each of the first veneer segment, second veneer segment, and insert segment have a respective grain, each respective grain extending along a respective grain axis, and
wherein the axis of the grain of the first veneer segment is perpendicular or generally perpendicular to the axis of the grain of the insert segment,
wherein the insert segment has a first dimension along the transverse axis and a second dimension along the longitudinal axis, wherein the first dimension of the insert segment is greater than the second dimension of the insert segment.

2. The surfacing product of claim 1, wherein the first veneer segment and the second veneer segment comprise the same material.

3. The surfacing product of claim 1, wherein each of the first veneer segment, the second veneer segment, and the insert segment comprise the same material.

4. The surfacing product of claim 1, wherein the first veneer segment and the second veneer segment each comprise a first material, wherein the insert segment comprises a second material that is different from the first material.

5. The surfacing product of claim 1, wherein each of the first veneer segment, second veneer segment, and insert segment comprise a different material.

6. The surfacing product of claim 1, wherein the first veneer segment has a first length along the longitudinal axis, wherein the second veneer segment has a second length along the longitudinal axis, wherein the first length is at least 50% greater than the second length.

7. The surfacing product of claim 1, wherein the first veneer segment has a first length along the longitudinal axis, wherein the second veneer segment has a second length along the longitudinal axis, wherein the first length is within 15% of the second length.

8. The surfacing product of claim 1, wherein at least one of the first veneer segment, the second veneer segment, or the insert segment comprises wood.

9. The surfacing product of claim 1, wherein at least one of the first veneer segment, the second veneer segment, or the insert segment comprises oak.

10. The surfacing product of claim 9, wherein the oak is white oak.

11. The surfacing product of claim 1, wherein the core comprises wood.

12. The surfacing product of claim 11, wherein the wood of the core is Russian Birch.

13. The surfacing product of claim 11, wherein the core comprises plywood.

14. The surfacing product of claim 11, wherein the core comprises a plurality of core segments that are coupled together at one or more respective lap joint junctions.

15. The surfacing product of claim 1, wherein the surfacing product has first and second edges that are spaced along the transverse axis and extend longitudinally along a length of the surfacing product, wherein the first and second edges define, respectively, a tongue and a groove.

16. The surfacing product of claim 1, wherein the first veneer segment and the second veneer segment abut the insert segment.

17. The surfacing product of claim 1, wherein the surfacing product has a length along the longitudinal axis, wherein the first veneer, second veneer, and insert segments cooperatively extend along the entire length, or substantially the entire length, of the surfacing product along the longitudinal axis.

18. A method of making a surfacing product, the method comprising:
coupling a first veneer segment, a second veneer segment, and a third veneer segment to a core with a binder to form the surfacing product, wherein said coupling comprises:
depositing the binder on the core; and
positioning the first veneer segment, the second veneer segment, and the third veneer segment on the core,
wherein the surfacing product has a longitudinal axis, a transverse axis that is perpendicular to the longitudinal axis, and a thickness axis that is perpendicular to each of the longitudinal axis and the transverse axis,
wherein the core of the surfacing product has a first surface and an opposed second surface that are spaced along the thickness axis,
wherein the first, second, and third veneer segments are coupled to the first surface of the core, wherein the first and second veneer segments are elongate along the longitudinal axis; and
wherein along the longitudinal axis, the third veneer segment is positioned between the first veneer segment and the second veneer segment,
wherein the third veneer segment has a first dimension along the transverse axis and a second dimension along the longitudinal axis, wherein the first dimension of the third veneer segment is greater than the second dimension of the third veneer segment.

19. The method of claim 18, wherein depositing the binder on the core comprises roll coating the binder onto the core.

20. The method of claim 18, wherein the binder comprises polyurethane resin.

21. The method of claim 18, further comprising pressing the core with the first and second veneer segments.

22. The method of claim 18, further comprising depositing epoxy on at least a portion of at least one of the first veneer segment or the second veneer segment.

23. The method of claim 22, further comprising sanding the epoxy.

24. The method of claim 18, wherein the surfacing product has first and second edges that are spaced along the transverse axis and extend longitudinally along the surfacing product, the method further comprising milling a tongue on the first edge and milling a groove on the second edge.

25. The method of claim 18, further comprising brushing the first and second veneer segments to form a texture on the first and second veneer segments.

26. The method of claim 18, further comprising applying one or more top coats and/or UV-cured sealers.

27. A surface covering comprising: a plurality of surfacing products as in claim 1, wherein the plurality of surfacing products are coupled together to define the surface covering.

28. The surface covering of claim 27, wherein the first veneer segment of a first surfacing product of the plurality of surfacing products has a first length along the longitudinal axis of the first surfacing product, wherein the second veneer segment of the first surfacing product has a second length along the longitudinal axis of the first surfacing product, wherein the first veneer segment of a second surfacing product of the plurality of surfacing products has a third length along the longitudinal axis of the second surfacing product, wherein the third length is different from the first length and the second length.

29. A kit comprising:
a plurality of surfacing products, wherein the plurality of surfacing products are configured to be selectively coupled together to define a surface covering, wherein each surfacing product of the plurality of surfacing products has a longitudinal axis, a transverse axis that is perpendicular to the longitudinal axis, and a thickness axis that is perpendicular to each of the longitudinal axis and the transverse axis, each surfacing product comprising:
a core having a first surface and an opposed second surface that are spaced along the thickness axis; and
a veneer coupled to the first surface of the core, wherein the veneer comprises:
a first veneer segment that is elongate along the longitudinal axis;

a second veneer segment that is elongate along the longitudinal axis; and a third veneer segment, wherein along the longitudinal axis, the third veneer segment is positioned between the first veneer segment and the second veneer segment, wherein the third veneer segment has a first dimension along the transverse axis and a second dimension along the longitudinal axis, wherein the first dimension of the third veneer segment is greater than the second dimension of the third veneer segment, wherein the plurality of surfacing products comprise:

a first surface covering product having a length; and two surface covering products having respective lengths, wherein a sum of the lengths of the two surface covering products is about equal to the length of the first surface covering product.

30. The method of claim 18, wherein the third veneer segment has a dimension along the longitudinal axis and a thickness along the thickness axis, wherein the dimension along the longitudinal axis is greater than the thickness along the thickness axis.

31. The method of claim 18, wherein each of the first, second and third veneer segments comprises one of: wood, wood composite material, high-pressure laminate, or stone.

32. A surfacing product having a longitudinal axis, a transverse axis that is perpendicular to the longitudinal axis, and a thickness axis that is perpendicular to each of the longitudinal axis and the transverse axis, the surfacing product comprising:

a core having a first surface and an opposed second surface that are spaced along the thickness axis; and a veneer coupled to the first surface of the core, wherein the veneer comprises:

a first veneer segment that is elongate along the longitudinal axis; and a second veneer segment that is elongate along the longitudinal axis; and an insert segment, wherein along the longitudinal axis, the insert segment is positioned between the first veneer segment and the second veneer segment, wherein the first veneer segment and the second veneer segment each comprise a first material, wherein the insert segment comprises a second material that is different from the first material.

33. A surfacing product having a longitudinal axis, a transverse axis that is perpendicular to the longitudinal axis, and a thickness axis that is perpendicular to each of the longitudinal axis and the transverse axis, the surfacing product comprising:

a core having a first surface and an opposed second surface that are spaced along the thickness axis; and a veneer coupled to the first surface of the core, wherein the veneer comprises:

a first veneer segment that is elongate along the longitudinal axis; and a second veneer segment that is elongate along the longitudinal axis; and an insert segment, wherein along the longitudinal axis, the insert segment is positioned between the first veneer segment and the second veneer segment, wherein each of the first veneer segment, the second veneer segment, and the insert segment comprise a different material.

* * * * *